United States Patent Office 3,547,898
Patented Dec. 15, 1970

3,547,898
PROCESS FOR THE PRODUCTION OF RESINS CONTAINING MALEIC HALF ESTERS
Leonard Shapiro, deceased, late of Cambridge, Mass., by Beatrice Shapiro, executrix, Cambridge, Mass., assignor to Freeport Industries, Inc., Boston, Mass., a corporation of Massachusetts
No Drawing. Continuation-in-part of application Ser. No. 404,177, Oct. 15, 1964. This application Oct. 2, 1967, Ser. No. 672,396
Int. Cl. C08f 15/02
U.S. Cl. 260—78.5  2 Claims

ABSTRACT OF THE DISCLOSURE

This invention comprises synthetic resins constituting the reaction product of styrene and maleic acid half esters. In addition to the maleic acid half esters there may also be present maleic anhydride. However, when a mixture of the maleic anhydride and maleic acid half esters is used, the half esters must constitute at least 50 mol percent of the mixture.

In any event, more than half of the ester content is preferably formed by the reaction of maleic anhydride and monoalkyl or alkaryl ethoxylates of primary aliphatic alcohols or alkyl phenols, the ethoxylates having from 4 to 15 carbon atoms in the alkyl or alkaryl radical. It is also preferable to include, among the half esters, those formed from maleic anhydride and lower alcohols having 1 to 3 carbon atoms.

---

This invention relates to novel synthetic resins prepared from styrene and maleic acid half esters, and it particularly relates to synthetic resins of the aforesaid type which are of relatively low molecular weight and, although soluble in aqueous ammonia, have sufficient water-resistance to form durable floor wax compositions which are substantially free of brittleness, have increased clarity, thereby providing increased luster, and are extremely compatible with the standard components of liquid floor polishes, whether natural or synthetic.

This is a continuation-in-part of co-pending application Ser. No. 404,177, filed Oct. 15, 1964, and now abandoned.

In accordance with the present invention, synthetic resins having the aforementioned characteristics, as well as their more water-soluble alkaline and ammonium salts, are prepared by the bulk polymerization of about 1 to 1.6 mols of styrene with 1 mol of a maleic acid constituent.

The maleic acid constituent is preferably a mixture of maleic anhydride and maleic acid half esters, wherein the half esters constitute at least 50 mol percent of the mixture. However, it is possible to utilize a maleic acid constituent having 100 mol percent of the half esters.

In either event, more than half or the half ester content should preferably be formed by the reaction of maleic anhydride and monoalkyl or alkaryl ethoxylates of primary aliphatic alcohols or alkyl phenols, the ethoxylates having from 4 to 16 carbon atoms in the alkyl or alkaryl radical. It is also preferable to include among the half esters those formed from maleic anhydride and lower alcohols having 1 to 3 carbon atoms.

Among the preferable ethoxylates are glycol ethers such as n-butyl "Cellosolve" and n-hexyl "Cellosolve." Also ethoxylated aliphatic alcohols such as are embodied in "Alfonic 1014-4" (a mixture of ethoxylated long chain alkyl alcohols having 10 to 14 carbon atoms in the chain and an average of 4 ethoxy groups on each alcohol group—(Continental Oil Co.), and "NP-14" ethoxylated nonylphenol containing 4 mols of ethylene oxide per mol of nonylphenol—Union Carbide Chemical Co.)

The bulk polymerization takes place at temperatures in excess of 100° C., in the absence of a solvent, and preferably in the presence of a chain regulator such as an alkyl mercaptan wherein the alkyl has 10 to 18 carbon atoms. The mercaptan should be present in an amount of about 0.5 to 5% relative to the total monomer.

The reaction is that of free radical polymerization typically initiated by 0.1 to 1.0 percent of a free radical initiator such as di-tertiary butyl peroxide, benzoyl peroxide or the like. In carrying out a preferred form of the process, a mixture of the various ingredients in proper proportions is made in a vessel equipped with an agitator and at a temperature which is approximately room temperature or cooler. While under constant agitation, this liquid blend of monomers is fed slowly to a reaction vessel equipped with an agitator, and in which the temperature is maintained at an elevated state, as for example, approximately 120–160° C. The actual temperature selected should be preferably above the boiling point of the styrene monomer. The resultant products of this reaction are copolymers or multipolymers in the form of flowable molten resin. The resin is formed almost immediately and there is no appreciable reflux. The products of this reaction are resins that are soluble in aqueous solutions of alkalies, ammonia or organic bases as well as organic solvents, particularly alcohols.

The molten resin may be drawn from the bottom of the reaction vessel, at the same rate as the monomer mixture is added to the top of the reaction vessel, into appropriate containers or onto a cooling-drum or film-casting belt for cooling and later grinding.

The new resinous materials of this invention have many applications, as, for example, in sizings or finishes for fabric, paper and leather; as thickeners for aqueous solutions; as suspending agents for pigments; as plasticizers for other plastics and as binders for pigments and fillers. One outstanding application is in the formulation of organic coatings and finishes such as floor wax and the like, wherein a basic ingredient is a resinous dispersion made from a resin of this invention.

The following examples are illustrative of the present invention, but with no intent to limit the invention except as claimed:

EXAMPLE 1

480 parts by weight of maleic anhydride (mol. wt.— 96) were heated in a clean, dry, glass-line reactor to 90° C. to form a melt.

A separate mixture was formed of 376.5 parts by weight n-butyl Cellosolve (mol. wt.—118) and 55.5 parts by weight methanol (mol. wt.—32). This mixture was formed at room temperature and pressure and while under agitation.

The mixture of butyl Cellosolve and methanol was then added to the maleic anhydride melt at such rate that an internal temperature of 100–110° C. was maintained, the reaction being exothermic. After the completion of the addition, the batch was maintained at 100–110° C. for 4 hours, and then was cooled to 50° C.

The batch was then filtered through a cartridge filter and the product obtained was a mixed ester of an average molecular weight of 186, containing about 67 mol percent of maleic half ester of butyl Cellosolve and about 32 mol percent of maleic half ester of methanol.

EXAMPLE 2

400 parts by weight of the mixed ester obtained in Example 1 was mixed with 3 parts by weight of di-tertiary butyl peroxide. This mixture will hereinafter be referred to as Premix A.

324 parts by weight of styrene was mixed with 28 parts by weight of dodecyl mercaptan at room temperature and pressure. This mixture will hereinafter be referred to as Premix B.

40 parts by weight of Premix A was mixed with 35.2 parts by weight of Premix B, under agitation, at such a rate as to maintain the heat developed by the exothermic reaction. When the temperature reached 140° C., an addition of 0.4 part by weight methanol was made in such increments as to maintain the temperature at 140–145° C. The batch was then kept at 140–145° C. for 4 hours.

The batch was then cooled until it solidified, and was then ground to fine particle size. The pulverulent product was clear, substantially colorless and readily soluble in alcohol and aqueous ammonia.

EXAMPLE 3

The same procedure was used as in Examples 1 and 2, except that n-hexyl Cellosolve was substituted for the n-butyl Cellosolve in a proportion of 0.7 mol n-hexyl Cellosolve and 0.15 mol methanol for each mol of maleic anhydride. Tertiary butyl hydroperoxide was also substituted for the di-tertiary butyl peroxide.

The resultant product was similar to that obtained in Example 2.

EXAMPLE 4

The same procedure, components and proportions were used as in Example 3, except that "Alfonic 1014-4" was substituted for the n-hexyl Cellosolve.

The resultant product was similar to those of both Examples 2 and 3.

EXAMPLE 5

The same procedure, components and proportions were used as in Example 3, except that "NP-14" was substituted for the n-hexyl Cellosolve.

The resultant product was similar to those of Examples 2, 3 and 4.

All of the above examples yielded resins which were generally clear, with a specific viscosity range of approximately 0.9 to 2.0. Films formed from all of these resins exhibited high water resistance. All of these resins were sufficiently soluble to form 10% solutions in aqueous ammonia.

The resins of this invention are typically not only ammonia soluble, but also soluble in liquid alcohols. Such alcohol solutions could be used directly as a substitute for a shellac solution in application on paper or wood to form a clear, hard film.

In addition to their general utility as protective colloids, the resins of this invention can be generally used as improved substitutes for shellac, providing superior properties to shellac in view of high film strength and uniformity. Because of their high water resistance, certain resins of this invention have been used to provide greatly improved floor wax or floor finish compositions. Thus, the following is a typical formulation of a synthetic floor wax utilizing the resins of this invention as a shellac substitute of improved water resistance:

10 parts by weight of the resin of Example 1 were dissolved in 87 parts of water and 3 parts of twenty-eight percent (28%) aqueous ammonia and after heating resulted in a clear, thin solution. 30 parts of this ammonia solution were agitated in a vessel with 40 parts of water, 1.5 parts of tri-butoxyethyl-phosphate and 1.5 parts of dibutyl phthalate. To this agitated dispersion were then added 65 parts of a twenty-percent (20%) aqueous dispersion of extremely fine particle size polystyrene, such as "UBS 2001" or "Beacon S 16." After these ingredients had been dispersed, there were then added 20 parts of a twenty percent (20%) aqueous dispersion of polyethylene which had been oxidized sufficiently to be dispersible, as, for example, Allied Chemical Company's "AC 629" or Eastman Chemical Company's "Epolene E 10." In addition, bactericidal agents and surfactants could have been added. This particular formation provided a synthetic floor wax of high film strength, high gloss, easy spreading and good durability.

Obviously, many modifications of the present invention are possible in the light of the above teachings. It it, therefore, to be understood that within the scope of the appended claims, the invention may be practiced otherwise than as specifically described.

The invention claimed is:

1. A process for making low molecular weight, ammonia-soluble synthetic resins which comprises heating maleic anhydride to form a melt, adding a member of the group consisting of monoalkyl and alkaryl ethoxylates, having from 4 to 15 carbon atoms in the alkyl or alkaryl group, to the melt at such a rate as to maintain a temperature of 100–110° C. for about 4 hours, then cooling the resultant mixed ester to about 50° C., thereafter mixing the resultant mixed ester with a free radical initiator, a chain regulator and styrene, and maintaining the total mixture at a temperature of about 120–160° C.

2. The process of claim 1 wherein a lower alcohol is added to the total mixture in an amount less than that of the ethoxylated compounds.

References Cited

UNITED STATES PATENTS

| | | | |
|---|---|---|---|
| 2,808,393 | 10/1957 | Harris | 260—78.5 |
| 3,342,787 | 9/1967 | Muskat | 260—78.5 |
| 3,380,972 | 4/1968 | Blanc et al. | 260—78.5 |
| 2,798,062 | 7/1957 | Contois | 260—78.5(HC) |

MURRAY TILLMAN, Primary Examiner

W. J. BRIGGS, Sr., Assistant Examiner

U.S. Cl. X.R.

260—29.6, 897